United States Patent
Brooks

(10) Patent No.: US 10,645,855 B2
(45) Date of Patent: May 12, 2020

(54) LIFT ARM CONTROL SYSTEM

(71) Applicant: CNH Industrial America LLC, New Holland, PA (US)

(72) Inventor: Nathan P. Brooks, Manitowoc, WI (US)

(73) Assignee: CNH Industrial America LLC, New Holland, PA (US)

( * ) Notice: Subject to any disclaimer, the term of this patent is extended or adjusted under 35 U.S.C. 154(b) by 304 days.

(21) Appl. No.: 15/635,514

(22) Filed: Jun. 28, 2017

(65) Prior Publication Data
US 2019/0000003 A1 Jan. 3, 2019

(51) Int. Cl.
*E02F 3/43* (2006.01)
*B66F 9/22* (2006.01)
(Continued)

(52) U.S. Cl.
CPC ....... *A01B 63/1006* (2013.01); *A01M 7/0057* (2013.01); *B05B 12/12* (2013.01); *B05B 13/005* (2013.01); *B05B 15/68* (2018.02)

(58) Field of Classification Search
CPC ....... A01B 79/005; A01B 63/00; A01B 76/00; A01B 45/00; A01B 59/068; A01B 63/10; A01B 63/1006; A01B 63/1115; A01B 69/008; A01B 73/062; A01M 7/0042; A01M 7/0053; A01M 7/0075; A01M 7/0085; A01C 23/008; A01C 23/00; A01D 41/127; B05B 13/005; B05B 12/124; B05B 13/0431; B05B 15/68; B05B 1/20; E02F 3/431; E02F 9/2029; E02F 3/304; E02F 3/3414; E02F 3/352; E02F 3/43; E02F 3/432; E02F 3/46; E02F 3/964;
(Continued)

(56) References Cited

U.S. PATENT DOCUMENTS 5,992,759 A 11/1999 Patterson
9,148,995 B2 10/2015 Hrnicek et al.
(Continued)

FOREIGN PATENT DOCUMENTS

CN 203775987 U 8/2014
CN 105052877 A * 11/2015
(Continued)

OTHER PUBLICATIONS

English translation of CN105052877.*
English translation of JP2005087180.*

*Primary Examiner* — Tuan C To
*Assistant Examiner* — Paul A Castro
(74) *Attorney, Agent, or Firm* — Rebecca L. Henkel; Rickard K. DeMille

(57) ABSTRACT

A lift arm control system can be configured to raise or lower a lift arm assembly of an agricultural machine with variable speed so that the lift arm assembly can optimally perform under varying conditions, including changing a tool connected to the lift arm assembly while stationary and/or moving the lift arm assembly while operating at various speeds in the field. The lift arm assembly can be manually configured to adjust with speeds that are proportional to a user input. The lift arm assembly can also be automatically configured to adjust with speeds that are proportional to sensor(s) input of the machine, such as a vehicle speed sensor.

10 Claims, 6 Drawing Sheets

(51) Int. Cl.
 *E02F 9/20* (2006.01)
 *A01B 63/10* (2006.01)
 *B05B 13/00* (2006.01)
 *B05B 12/12* (2006.01)
 *B05B 15/68* (2018.01)
 *A01M 7/00* (2006.01)

(58) Field of Classification Search
 CPC ..... E02F 9/2025; E02F 9/2041; E02F 9/2062;
 E02F 9/2246; E02F 9/226; E02F 9/2004;
 E02F 9/22; E02F 9/2203; E02F 9/262;
 E02F 3/34; E02F 3/434; E02F 9/2253;
 E02F 9/2221; E02F 3/16; E02F 3/422;
 E02F 9/2214; E02F 9/2235; E02F 9/225;
 E02F 9/2292; E02F 9/2296
 See application file for complete search history.

(56) References Cited

U.S. PATENT DOCUMENTS

| | | | |
|---|---|---|---|
| 9,155,239 B2 | 10/2015 | Hatanaka et al. | |
| 2011/0255411 A1* | 10/2011 | Isaac | H04L 12/4625 |
| | | | 370/241 |
| 2013/0299601 A1 | 11/2013 | Ballu | |
| 2014/0277676 A1 | 9/2014 | Gattis et al. | |
| 2016/0040398 A1* | 2/2016 | Kitajima | E02F 3/435 |
| | | | 701/50 |

FOREIGN PATENT DOCUMENTS

| | | | |
|---|---|---|---|
| JP | 1181710 A | | 7/1989 |
| JP | 9121616 A | | 5/1997 |
| JP | 2005087180 A | * | 4/2005 |
| JP | 2005087180 A | | 4/2005 |

\* cited by examiner

LIFT ARM CONTROL SYSTEM

FIELD OF THE INVENTION

The invention relates generally to agricultural product application equipment such as self-propelled sprayers and, in particular, to a lift arm control system for agricultural machines in which a lift system is controlled to raise or lower a lift arm assembly including lift arms supporting a center section according to a received command and at a speed determined from a received parameter.

BACKGROUND OF THE INVENTION

High-clearance sprayers are getting larger and more complex to allow for increasing coverage in a single pass and with faster speeds to improve application efficiency. Many high-clearance sprayers are configured with lift arm assemblies for attaching sprayer booms. The lift arm assemblies can oftentimes be raised, lowered and/or tilted in the field to allow optimum application.

To further improve efficiency, many sprayers allow interchangeable tools that can be used in place of sprayer booms, such as "swathers" (farm implements which cut hay or small grain crops and form them into "windrows") and "injection toolbars" (farm implements which inject fertilizer or other materials between rows). Interchanging sprayer booms for other tools is typically accomplished through a quick attach system that provides disconnect points for hydraulic and electrical functions and hook-like weldments for mechanically coupling the boom or other tools with a lift arm assembly.

To change such tools, lift arm assemblies are typically raised or lowered into a desired position for removal of one tool and installation of another. However, it can be difficult to interchange such tools, which typically requires precise control and alignment, due to the speed at which the lift arm assembly moves up or down. In addition, when raising or lowering the lift arm assembly at high speeds, such movement can cause instability of the machine due to reactionary forces in response to the movement. Consequently, what is needed is an improved lift arm system which overcomes one or more of the aforementioned drawbacks.

SUMMARY OF THE INVENTION

A lift arm control system can be configured to raise or lower a lift arm assembly of an agricultural machine with variable speed so that the lift arm assembly can optimally perform under varying conditions, including changing a tool connected to the lift arm assembly while stationary and/or moving the lift arm assembly while operating at various speeds in the field. The lift arm assembly can be manually configured to adjust with speeds that are proportional to a user input. The lift arm assembly can also be automatically configured to adjust with speeds that are proportional to sensor(s) input of the machine, such as a vehicle speed sensor.

Lift arm lift/lower controls can be configured with proportional controls for adjusting the speed of movement of the lift arm assembly while raising and lowering. This can allow for limiting raise/lower speeds of the lift arms to relatively lower speeds when it is beneficial to have slower movements of the lift arms. In one aspect, lift arm speed control is provided that allows a user to adjust lift/lower speed. This could be a user-adjustable proportional control such as a slider and/or other button(s) for controlling rate or a user-selectable setting such as a tool-change mode with an assigned predetermined slower rate. In addition, or alternatively, adjustment can be done automatically with a controller that can detect, for example, travel speed of the sprayer and limit lift/lower speed accordingly.

Specifically then, one aspect of the present invention can provide a lift arm control system for an agricultural machine including: a lift arm assembly including multiple lift arms supporting a center section; a lift system configured to move the lift arm assembly up and down; a controller in communication with the lift system, the controller executing a program stored in a non-transient medium operable to: (a) receive a command for raising or lowering the lift arm assembly; (b) receive a parameter for determining a speed for raising or lowering the lift arm assembly; and (c) control the lift system to raise or lower the lift arm assembly according to the command and at the speed determined from the parameter.

Another aspect can provide a method for controlling a lift arm assembly for an agricultural machine, the method including: receiving a command for raising or lowering a lift arm assembly, the lift arm assembly including multiple lift arms supporting a center section; receiving a parameter for determining a speed for raising or lowering the lift arm assembly; and controlling a lift system configured to move the lift arm assembly to raise or lower the lift arm assembly according to the command and at the speed determined from the parameter.

Another aspect can provide an agricultural sprayer including: a chassis supported by multiple wheels, the chassis supporting an engine; a drive system; a lift arm assembly including a plurality of lift arms supporting a center section; a sprayer boom connected to the center section, the sprayer boom having multiple spray nozzles; and an operator cab having a door or window; a lift system configured to move the lift arm assembly up and down; and a controller in communication with the lift system, the controller executing a program stored in a non-transient medium operable to: (a) receive a command for raising or lowering the lift arm assembly; (b) receive a parameter for determining a speed for raising or lowering the lift arm assembly; and (c) control the lift system to raise or lower the lift arm assembly according to the command and at the speed determined from the parameter.

Other aspects, objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

DESCRIPTION OF THE DRAWINGS

Preferred exemplary embodiments of the invention are illustrated in the accompanying drawings in which like reference numerals represent like parts throughout.

DETAILED DESCRIPTION OF THE PREFERRED EMBODIMENTS

Figure 1:
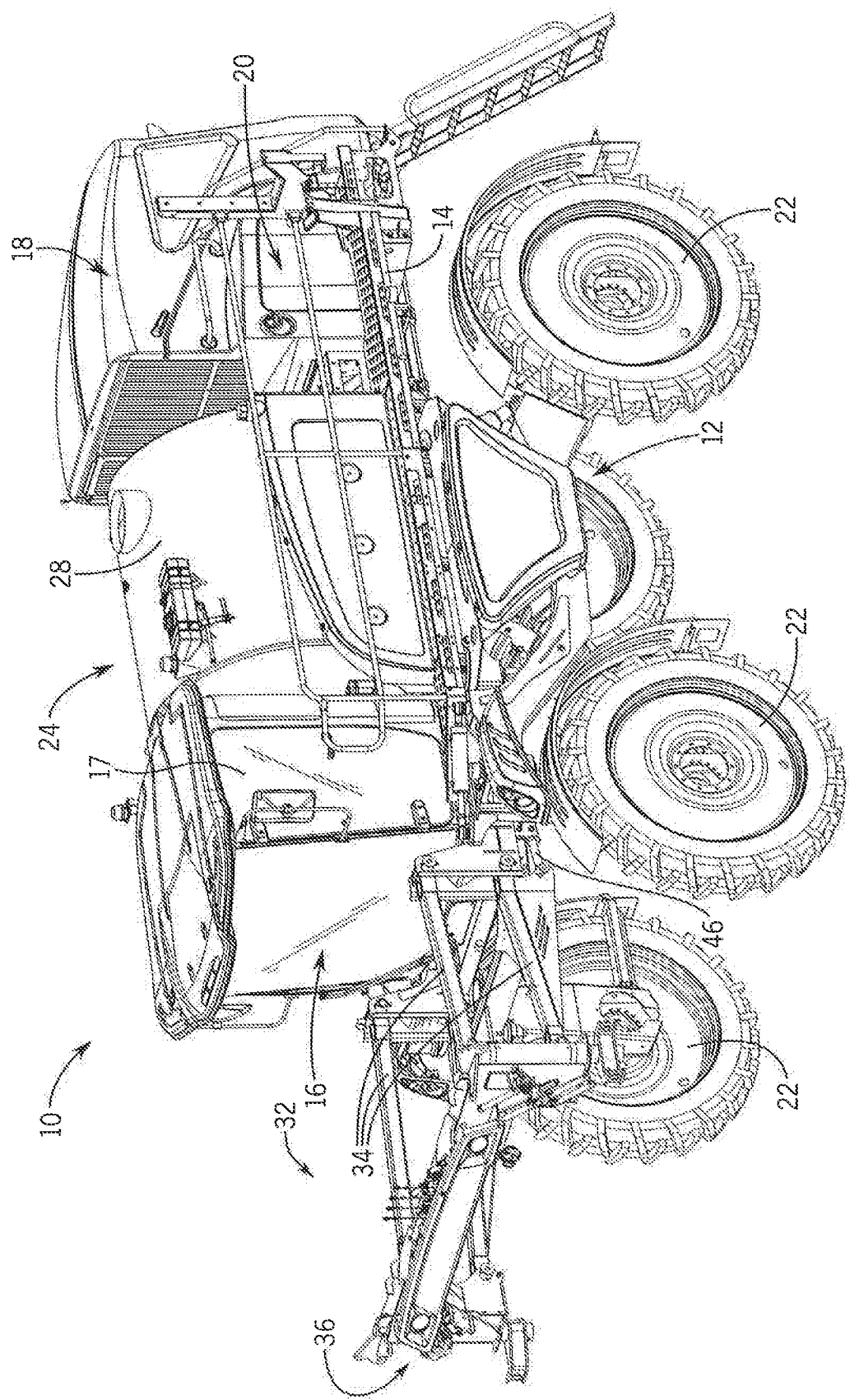
FIG. 1 is an isometric view of an agricultural machine in accordance with an aspect of the invention.

Referring now to the drawings and specifically to FIG. 1, aspects of the invention are shown for use with an agricultural machine which could be an agricultural sprayer. The agricultural sprayer is shown here as a self-propelled agricultural sprayer vehicle or self-propelled sprayer 10. Although sprayer 10 is shown as a front-mounted boom self-propelled sprayer, it is understood that self-propelled versions of sprayer 10 can have either front-mounted or rear-mounted booms, such as those available from CNH Industrial, including the Miller Nitro and Condor Series sprayers and New Holland Guardian Series sprayers.

Still referring to FIG. 1, sprayer 10 includes a chassis 12 having a chassis frame 14 that supports various assemblies, systems, and components. These various assemblies, systems, and components can include an operator cab 16 having a cab door 17 or window, an engine 18 and a hydraulic system 20. The hydraulic system 20 receives power from the engine 18 and includes at least one hydraulic pump which can be in a hydrostat arrangement for providing hydraulic pressure for operating hydraulic components within the hydraulic system 20. For sprayers with hydrostatic drives, hydraulic motors are operably connected to the hydraulic pump(s) for rotating the wheels 22. In mechanical drive applications, a mechanical transmission receives power from the engine 18 and delivers power for rotating the wheels 22 by way of power-transmitting driveline components such as drive shafts, differentials, and other gear sets in portal, drop boxes, or other housings. A spray system 24 can include storage containers such as rinse tank for storing water or a rinsing solution and a product tank 28 for storing a volume of product for delivery onto an agricultural field with sprayer 10. A product delivery pump can convey product from the product tank 28 through plumbing components such as interconnected pieces of tubing and through a boom tubing system for release out of spray nozzles that are spaced from each other along the width of boom 30 (shown in FIG. 2) during spraying operations of sprayer 10. Groups or banks of multiple adjacent spray nozzles define multiple spray sections of the spray system. Spray sections are defined along boom 30 and selectively deliver product for release onto an agricultural field at locations corresponding to positions of activated spray sections. Boom 30 can be supported by a lift arm assembly 32 connected to the chassis 12. The lift arm assembly 32 can include multiple lift arms 34 supporting a center section 36 which, in turn, is configured to electrically and mechanically receive and support the boom 30. The lift arm assembly 32 can be configured to move up and down, for moving the boom 30, for adjusting the height of application of the product. In addition, the center section 36 can be configured with a quick attach system for interchanging the boom 30 with other tools, such as "swathers" or "injection tools." The quick attach system can provide disconnect points for hydraulic and electrical functions and hook-like weldments for mechanically coupling the desired tool with the lift arm assembly 32.

Figure 2:
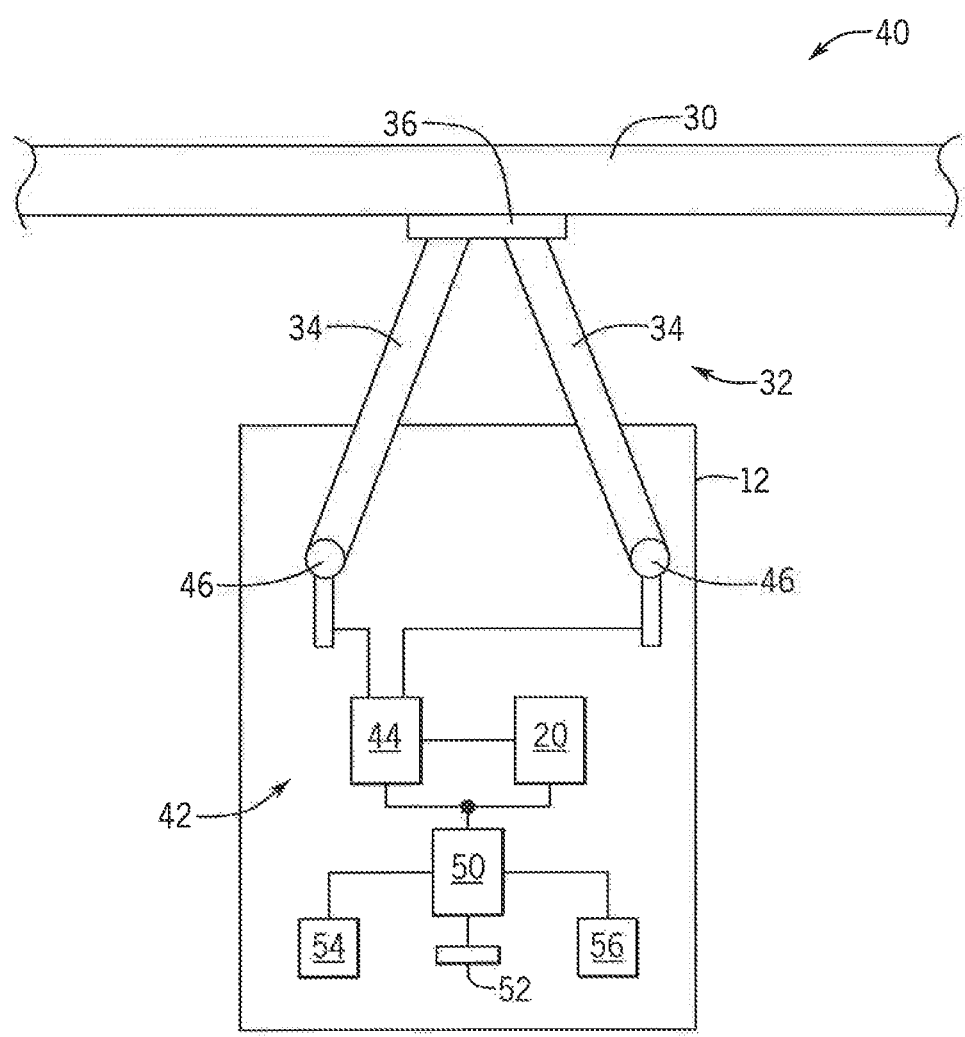
FIG. 2 is block diagram of a lift arm control system implemented with respect to the machine of FIG. 1 in which a lift arm assembly is controlled to raise or lower with variable speed in accordance with an aspect of the invention.

With additional reference to FIG. 2, a block diagram of a lift arm control system 40 implemented with respect to the sprayer 10 is provided in accordance with an aspect of the invention. In addition to the lift arm assembly 32, a lift system 42 is configured to move the lift arm assembly 32 up and down. The lift system 42 can include a hydraulic pressure system 44, operating cooperatively with the hydraulic system 20, to operate hydraulic lift cylinders 46 for raising or lowering the lift arms 34. The hydraulic pressure system 44 could include one or more pump(s), valve(s), pressure line(s) and/or accumulator(s) for applying or relieving fluidic pressure in order to actuate the hydraulic lift cylinders 46 as desired. The hydraulic lift cylinders 46, in turn, can be connected to the lift arms 34 so that the hydraulic lift cylinders 46 can operate to raise or lower the lift arms 34 according to demands of the lift system 42.

Figure 5:
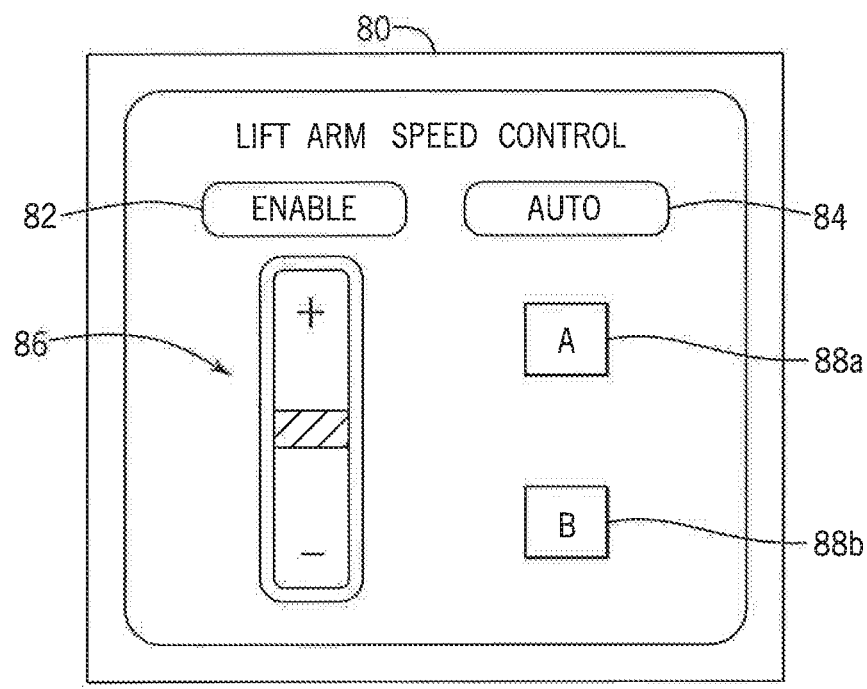
FIG. 5 is a Human Machine Interface (HMI) which could be part of a user interface for providing manual input to the lift arm control system in accordance with an aspect of the invention.
Figure 6:
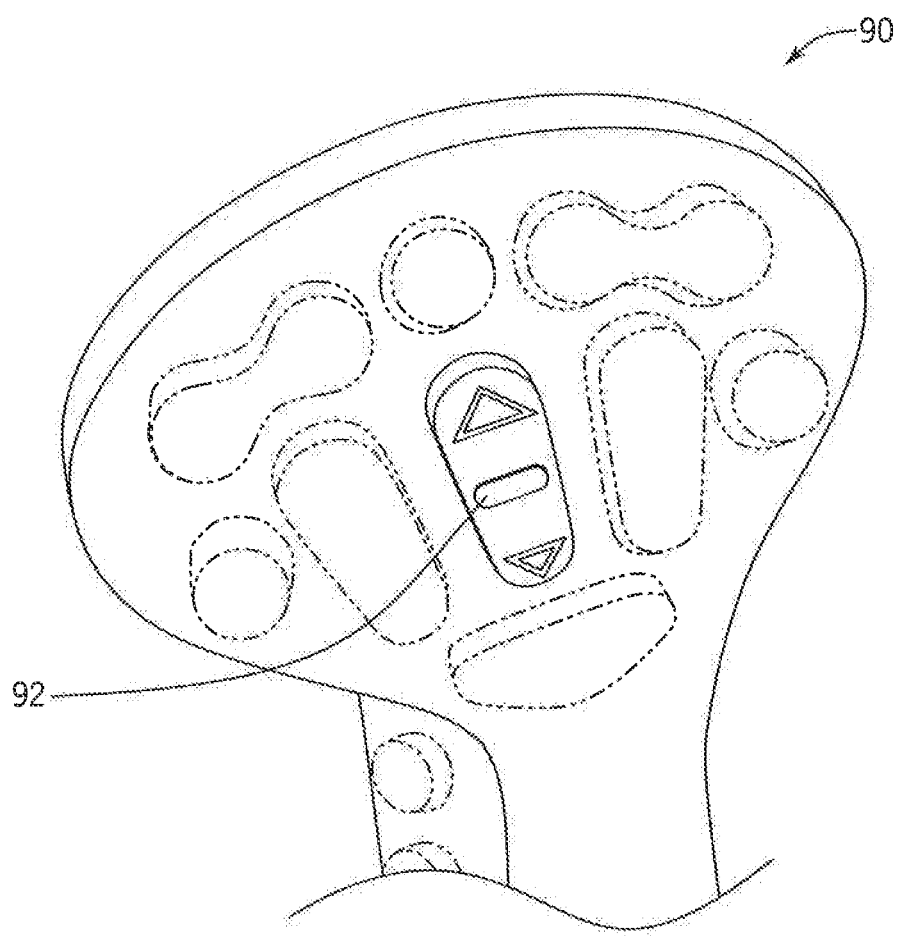
FIG. 6 is a joystick which could be part of a user interface for providing manual input to the lift arm control system in accordance with an aspect of the invention.

A controller 50 can be in communication with the hydraulic system 20 and/or the lift system 42 to control the lift system 42 to raise or lower the lift arm assembly 32 with variable speed as desired. The controller 50 can be a microprocessor, a microcontroller or other programmable logic element configured to execute a program stored in a non-transient medium 52 as known the art. Accordingly, the controller 50 can execute to: (a) receive a command for raising or lowering the lift arm assembly 32; (b) receive a parameter for determining a speed for raising or lowering the lift arm assembly 32; and/or (c) control the lift system 42 to raise or lower the lift arm assembly 32 according to the command and at the speed determined from the parameter. The lift arm control system 40 can also include a sensor 54 for detecting a condition of the sprayer 10, and/or a user interface 56 in the operator cab 16, for communicating the command and/or the parameter to the controller 50, as will be described herein. The sensor 54 could be, for example, a vehicle speed sensor configured to sense a travel speed of the sprayer 10 and provide a corresponding parameter indicating such travel speed to the controller 50. The user interface 56 could include, for example, a Human Machine Interface (HMI) 80 (shown in FIG. 5) and/or joystick 90 (shown in FIG. 6) in the operator cab 16, configured to receive input from an operator and provide corresponding parameters commands to the controller 50. The user interface 56 can also display and/or otherwise provide feedback to the operator as will be described herein. The sensor 54 and/or the user interface 56 can be connected to the controller 50 via one or more International Organization for Standardization (ISO) 11898 Controller Area Network (CAN) buses.

Figure 3:
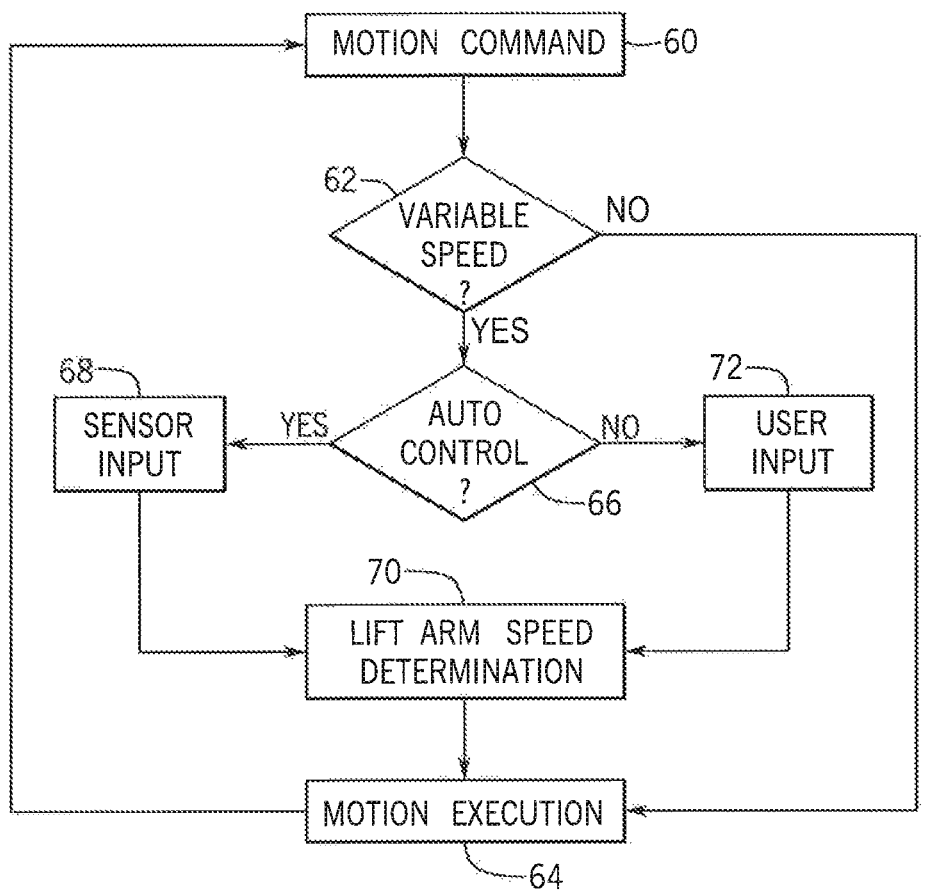
FIG. 3 is block diagram illustrating operation of the lift arm control system of FIG. 2 in accordance with an aspect of the invention.

Referring now to FIG. 3, a block diagram illustrating operation of the lift arm control system 40 is provided in accordance with an aspect of the invention. Beginning at block 60, a motion command can be generated in the system which, in turn, is communicated to the controller 50. The command could be to raise or lower the lift arm assembly 32. With additional reference to FIG. 6, the command could be generated, for example, by the joystick 90 in the operator cab 16, in which an upper portion of a joystick button 92 could be pressed by the operator to raise the lift arm assembly 32, and a lower portion of the joystick button 92 could be pressed by the operator to lower the lift arm assembly 32.

Next, at decision block 62, the controller 50 can determine whether the received command should be executed with variable speed control. Variable speed control can be a condition set by the operator, for example, in the operator cab via an enable/disable toggle button 82 of the HMI 80. If variable speed control is disabled, the process can continue to block 64 in which the controller 50 controls the lift system 42 to execute the command, without regard to speed. The process can then return to block 60 for the next motion command. However, if at decision block 62 the controller 50 determines that variable speed control is enabled, the process can instead continue to the decision block 66 in which the controller 50 can determine whether such variable speed control should be determined automatically or manually. Automatic versus manual variable speed control can be another condition set by the operator, for example, in the operator cab via an automatic/manual toggle button 84 of the HMI 80.

Figure 4A:
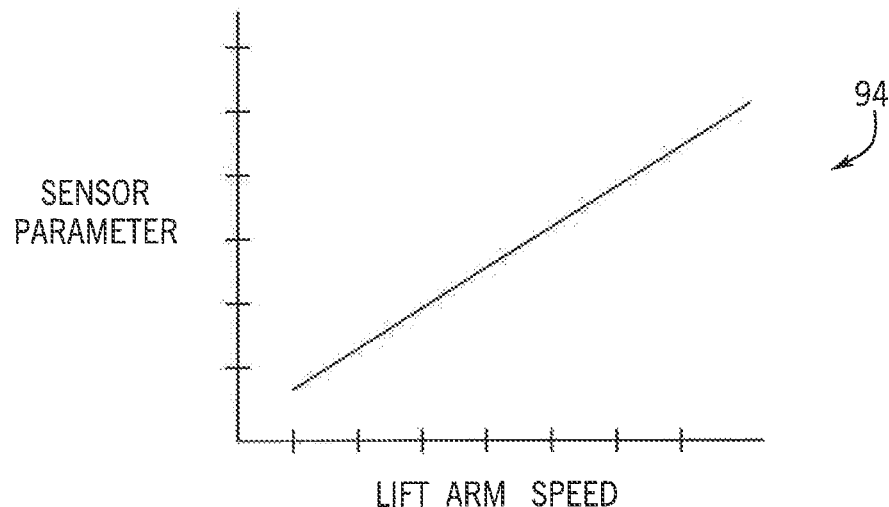
FIG. 4A is an exemplar graph illustrating proportional control of the lift arm control system of FIG. 2 based on sensor input.

If variable speed control is determined to be automatic, the process can continue to block 68 in which the sensor 54 detects a condition of the sprayer 10 and communicates a parameter corresponding to the detected condition to the controller 50. In a preferred aspect, the sensor 54 is a vehicle speed sensor configured to sense a travel speed of the sprayer 10, and the parameter from the sensor 54 provides a value corresponding to such travel speed. Next, at block 70, the controller 50, receiving the parameter, determines a speed for the lift system 42 from the parameter. For example, with additional reference to FIG. 4A, the controller 50 can reference a graph 94 or similarly tabulated data stored in the non-transient medium 52 for determining the speed according to the parameter. Preferably, the controller 50 determines a speed that is in proportion to the parameter. As used herein, the speed and parameter are in "proportion" if a change in one is always accompanied by a change in the other and if the changes are related by use of a constant multiplier. Next, at block 64, the controller 50 controls the lift system 42 to execute the command at the speed that is determined from the parameter.

However, if at decision block 62 variable speed control is determined to be manual, the process can instead continue to block 72 in which the user interface 56 receives input from the operator and communicates a parameter corresponding to the input to the controller 50. For example, referring again to FIG. 5, the HMI 80 can receive input from the operator via a slider 86 which can be increased by the operator to increase speed of the lift system 42 or decreased by the operator to decrease speed of the lift system 42. In addition, or alternatively, the HMI 80 can receive input from the operator via multiple preset buttons 88, such as first and second preset buttons 88a and 88b, labeled "A" and "B," respectively, corresponding to differing predetermined speeds of the lift system 42. The preset buttons 88 could be predetermined at the time of manufacture and/or be programmable by the operator. In a preferred aspect, one preset button 88, such as the preset button 88a ("A") could correspond to a relatively slow speed for the lift system 42 that is suitable for precise control and alignment of the lift system 2 for interchanging tools at the center section 36, while another preset button 88, such as the preset button 88b ("B") could correspond to a relatively fast speed for the lift system 42 that is suitable for field operations at relatively low vehicle travel speeds.

Figure 4B:
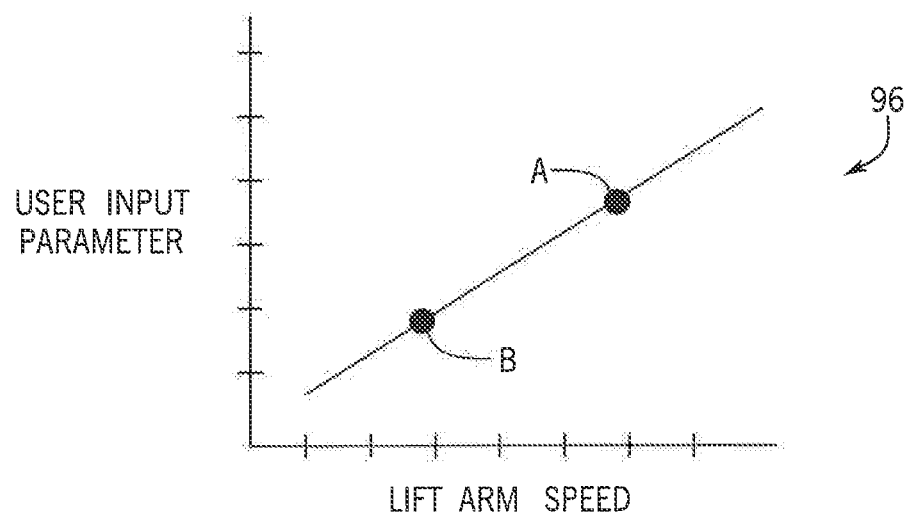
FIG. 4B is an exemplar graph illustrating proportional control of the lift arm control system of FIG. 2 based on manual input, each in accordance with an aspect of the invention.

Based on input from the user interface 56, such as via the slider 86 or the preset buttons 88, the user interface 56 provides the parameter to the controller 50 corresponding to the input. Next, at block 70, the controller 50, receiving the parameter, determines a speed for the lift system 42 from the parameter. For example, with additional reference to FIG. 4B, the controller 50 can reference a graph 96 or similarly tabulated data stored in the non-transient medium 52 for determining the speed according to the parameter. Preferably, the controller 50 determines a speed that is in proportion to the parameter. Where preset buttons 88 are used, the parameter could translate to a look up value for the speed. Next, at block 64, the controller 50 controls the lift system 42 to execute the command at the speed that is determined from the parameter.

Although the best mode contemplated by the inventors of carrying out the present invention is disclosed above, practice of the above invention is not limited thereto. It will be manifest that various additions, modifications and rearrangements of the features of the present invention may be made without deviating from the spirit and the scope of the underlying inventive concept.

What is claimed is:

1. A lift arm control system for an agricultural machine comprising:
    a lift arm assembly comprising a plurality of lift arms supporting a center section;
    a lift system configured to move the lift arm assembly up and down;
    a sensor for detecting a vehicle speed of the agricultural machine;
    a controller in communication with the lift system and the sensor, the controller executing a program stored in a non-transient medium operable to:
    (a) receive a command for raising or lowering the lift arm assembly;
    (b) receive a command from a user interface selecting one of automatic control and manual control for raising or lowering the lift arm assembly;
    (c) with automatic control selected, receive the detected vehicle speed from the sensor and determining a speed for raising or lowering the lift arm assembly in response thereto; and
    (d) control the lift system to raise or lower the lift arm assembly according to the command at the speed determined.

2. The system of claim 1, wherein the lift system is a hydraulic lift system comprising a plurality of hydraulic lift cylinders, wherein the plurality of hydraulic lift cylinders are configured to raise or lower the plurality of lift arms.

3. The system of claim 1, wherein the center section is configured to support a sprayer boom having a plurality of spray nozzles.

4. The system of claim 1, wherein the controller controls the speed for the lift system to be in proportion to the parameter.

5. The system of claim 1, wherein the user interface comprises a Human Machine Interface (HMI) and a joystick.

6. The system of claim 1, wherein the command is received via an ISO 11898 Controller Area Network (CAN) bus.

7. A method for controlling a lift arm assembly for an agricultural machine, the method comprising:
    supporting a center section with a plurality of lift arms, the center section and the plurality of lift arms defining the lift arm assembly;

receiving a first command at a controller for raising or lowering the lift arm assembly and a second command at the controller selecting one of automatic control and manual control for raising or lowering the lift arm assembly;

when in the manual control, receiving a third command from a user interface selecting a speed for raising or lowering the lift arm assembly;

when in the automatic control, determining the speed for raising or lowering the lift arm assembly in response to a vehicle travel speed of the agricultural machine; and controlling a lift system configured to move the lift arm assembly to raise or lower the lift arm assembly according to the first command and at the speed.

8. The method of claim 7, wherein the lift system is a hydraulic lift system comprising a plurality of hydraulic lift cylinders, wherein the plurality of hydraulic lift cylinders are configured to raise or lower the plurality of lift arms.

9. The method of claim 7, wherein the user interface comprises an HMI and a joystick.

10. An agricultural sprayer comprising:
a chassis supported by a plurality of wheels, the chassis supporting:
an engine;
a drive system;
a lift arm assembly comprising a plurality of lift arms supporting a center section;
a sprayer boom connected to the center section, the sprayer boom having a plurality of spray nozzles; and
an operator cab having a door or window;
a lift system configured to move the lift arm assembly up and down;
a sensor for detecting a vehicle speed of the agricultural sprayer; and
a controller in communication with the lift system and the sensor, the controller executing a program stored in a non-transient medium operable to:
(a) receive a command for raising or lowering the lift arm assembly;
(b) receive a command from a user interface electing one of automatic control and manual control for raising or lowering the lift arm assembly;
(c) with automatic control selected, receive the detected vehicle speed from the sensor and determining a speed for raising or lowering the lift arm assembly in response thereto; and
(d) control the lift system to raise or lower the lift arm assembly according to the command at the speed determined.

* * * * *